United States Patent
Pandhare et al.

(10) Patent No.: US 7,549,005 B1
(45) Date of Patent: Jun. 16, 2009

(54) SYSTEM AND METHOD FOR MANAGING INTERRUPTS

(75) Inventors: Shashank J. Pandhare, Aliso Viejo, CA (US); Thanh N. Nguyen, Ladera Ranch, CA (US); Ronald M. Mercer, Huntington Beach, CA (US); Ying P. Lok, Ladera Ranch, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 146 days.

(21) Appl. No.: 11/615,329

(22) Filed: Dec. 22, 2006

(51) Int. Cl.
*G06F 13/24* (2006.01)
(52) U.S. Cl. .................... 710/262; 710/240; 710/260
(58) Field of Classification Search ......... 710/260–269, 710/240–244
See application file for complete search history.

(56) References Cited

U.S. PATENT DOCUMENTS

| 5,530,875 | A | * | 6/1996 | Wach | ............... 710/264 |
| 2004/0098369 | A1 | * | 5/2004 | Elzur | ............... 707/1 |

* cited by examiner

*Primary Examiner*—Clifford H Knoll
*Assistant Examiner*—Kim T Huynh
(74) *Attorney, Agent, or Firm*—Klein, O'Neill & Singh, LLP

(57) ABSTRACT

Method and system for managing interrupts originating from multiple sources is provided. The method includes assigning interrupt sources to a group; notifying an adapter of interrupt groups; identifying each interrupt group; writing a first interrupt to an interrupt module, where the interrupt occurs from a first source of the multiple sources; monitoring for a second interrupt; suspending the second interrupt until the first interrupt is processed, if the second interrupt is requested from the first source; and processing the second interrupt, if the second interrupt occurs from a source other than the first source.

16 Claims, 4 Drawing Sheets

SYSTEM AND METHOD FOR MANAGING INTERRUPTS

BACKGROUND

1. Field of the Invention

The present invention relates to network systems, and more particularly, to managing interrupts.

2. Background of the Invention

Computer networks are commonly used today in various applications. Computer networks typically use a layered protocol structure to manage network traffic. One common model that is typically used is the ISO model that includes a physical layer, a data link layer that includes a MAC layer, a network layer and others. Upper level protocol layers (ULPs) (for example, iSCSi and RDMA) described below, interface with a network layer to send and receive data from the network.

Adapters are used by host systems to interface with computer networks. Various components and modules in these adapters can generate interrupts for a host system. Therefore, there is a need for a system and method to efficiently manage interrupts originating from multiple modules.

SUMMARY OF THE INVENTION

In one aspect of the present invention, a method for managing interrupts originating from multiple sources is provided. The method includes assigning interrupt sources to a group; notifying an adapter of interrupt groups; identifying each interrupt group; writing a first interrupt to an interrupt module, where the interrupt occurs from a first source of the multiple sources; monitoring for a second interrupt; suspending the second interrupt until the first interrupt is processed, if the second interrupt is requested from the first source; and processing the second interrupt, if the second interrupt occurs from a source other than the first source.

In another aspect of the present a system for managing interrupts originating from multiple sources is provided. The system includes a host system that establishes a network connection via a network adapter; wherein the adapter includes the multiple sources and an interrupt module for holding the interrupts generated from the multiple sources; and each of the multiple interrupts are assigned to a group; wherein a first interrupt from a first source of the multiple sources is written to the interrupt module; wherein a second interrupt requested from the first source is suspended until the first interrupt is processed; and the second interrupt is processed if the second interrupt occurs from a source other than the first source.

In yet another aspect of the present invention, a network adapter coupled to a host system is provided. The adapter includes multiple sources for generating interrupts; and an interrupt module for holding the interrupts generated from the multiple sources; wherein each of the multiple interrupts are assigned to a group; wherein a first interrupt from a first source of the multiple sources is written to an interrupt module; and a second interrupt requested from the first source is suspended until the first interrupt is processed; and the second interrupt is processed if the second interrupt occurs from a source other than the first source.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Figure 1A:
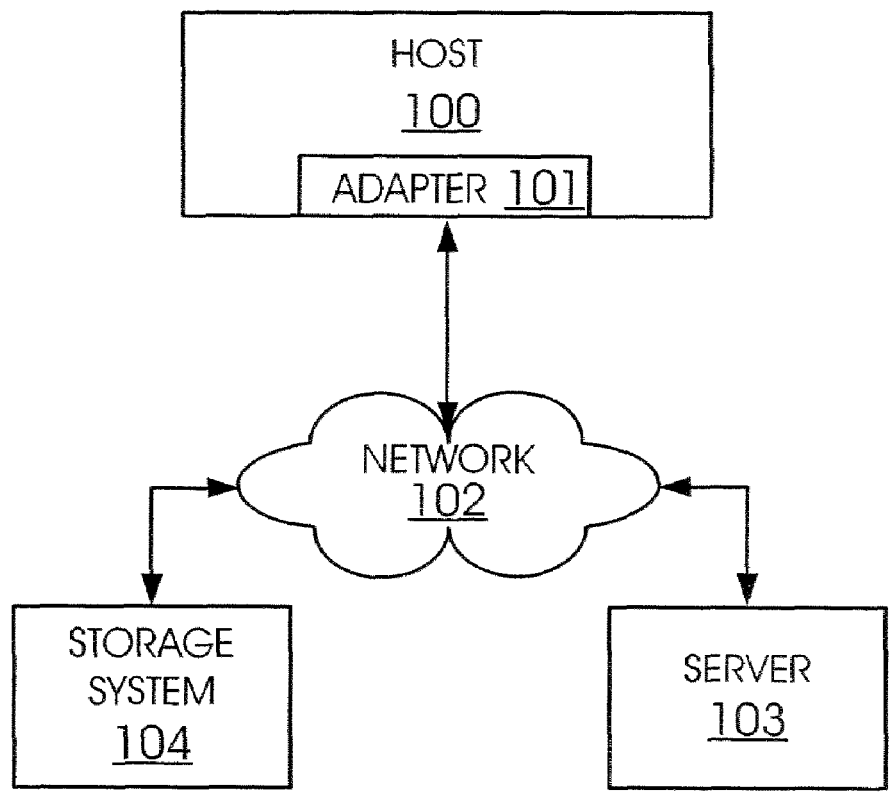
FIG. 1A shows a top-level block diagram of a network system.

To facilitate an understanding of the preferred embodiment, the general architecture and operation of a host system will be described. The specific architecture and operation of the preferred embodiment will then be described with reference to the general architecture.

Various protocols (or standards or interface, used interchangeably throughout this specification) are currently used by computing systems and devices to communicate via networks. The following provides an introduction of some of the protocols:

Transmission Control Protocol/Internet Protocol ("TCP/IP"): TCP is a standard network protocol (incorporated herein by reference in its entirety) that provides connection-oriented, reliable, byte stream service. This means that two nodes establish a logical connection before sending data and that TCP maintains state information regarding the data transfer. Reliable means that data is delivered in the same order that it was sent. A byte stream service means that TCP views data to be sent as a continuous data stream that is sent in any way it sees fit and delivers it to the remote node as a byte stream.

The IP standard protocol (incorporated herein by reference in its entirety) provides a datagram service whose function is to enable routing of data through various network subnets. Each of these subnets could be a different physical link such as Ethernet, ATM, etc. IP is also responsible for fragmentation of the transmit data to match a local link's maximum transmission unit (MTU). IP can fragment data at a source node or at any intervening router between the source and destination node.

A complete description of the TCP/IP protocol suite is provided in "TCP/IP" Illustrated, Vol. 1 by W. Richard Stevens and Volume 2 by Gary R. Wright and W. Richard Stevens published by Addison Wesley Professional Computing Series that is incorporated herein by reference in its entirety.

iSCSI Protocol: Internet SCSI (iSCSI) as defined by the Internet Engineering Task Force (IETF) maps the standard SCSI protocol on top of the TCP/IP protocol. iSCSI (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners. The iSCSI and TCP/IP protocol suite consist of 4 protocol layers; the application layer (of which iSCSI is one application), the transport layer (TCP), the network layer (IP) and the link layer (i.e. Ethernet).

A traditional SCSI connection between a host system and peripheral device is through parallel cabling and is limited by distance and device support constraints. For storage applications, iSCSI was developed to take advantage of network architectures based on Ethernet standards. iSCSI leverages the SCSI protocol over established networked infrastructures and defines the means for enabling block storage applications over TCP.

The iSCSI architecture is based on a client/server model. Typically, the client is a host system such as a file server that issues a read or write command. The server may be a disk array that responds to the client request. Typically the client is an initiator that initiates a read or write command and a disk array is a target that accepts a read or write command and performs the requested operation.

In a typical iSCSI exchange, an initiator sends a "read" or "write" command to a target. For a read operation, the target sends the requested data to the initiator. For a write command, the target sends a "Ready to Transfer Protocol Data Unit ("PPDU")" informing the initiator that the target is ready to accept the write data. The initiator then sends the write data to the target. Once the data is transferred, the exchange enters the response phase. The target then sends a response PDU to the initiator with the status of the operation. Once the initiator receives this receives this response, the exchange is complete. The use of TCP guarantees the delivery of the PDUs.

Typically, logical units in the target process commands. Commands are sent by the host system in Command Descriptor Blocks ("CDB"). A CDB is sent to a specific logical unit, for example, the CDB may include a command to read a specific number of data blocks. The target's logical unit transfers the requested data block to the initiator, terminating with a status message indicating completion of the request. iSCSI encapsulates CDB transactions between initiators and targets over TCP/IP networks.

RDMA: Remote Direct Memory Access (RDMA) is a standard upper layer protocol (incorporated herein by reference in its entirety) that assists one computer to directly place information in another computer's memory with minimal demands on memory bus bandwidth and CPU processing overhead. RDMA over TCP/IP defines the interoperable protocols to support RDMA operations over standard TCP/IP networks. A network interface card (or adapter) that can off-load TCP/IP protocol processing and support RDMA over TCP/IP may be referred to as an RNIC.

FIG. 1A shows a top-level block diagram of a network system that includes a host computing system 100 with a network adapter 101. Host system 100 can communicate with a server 103 and storage system 104 via network 102.

Figure 1B:
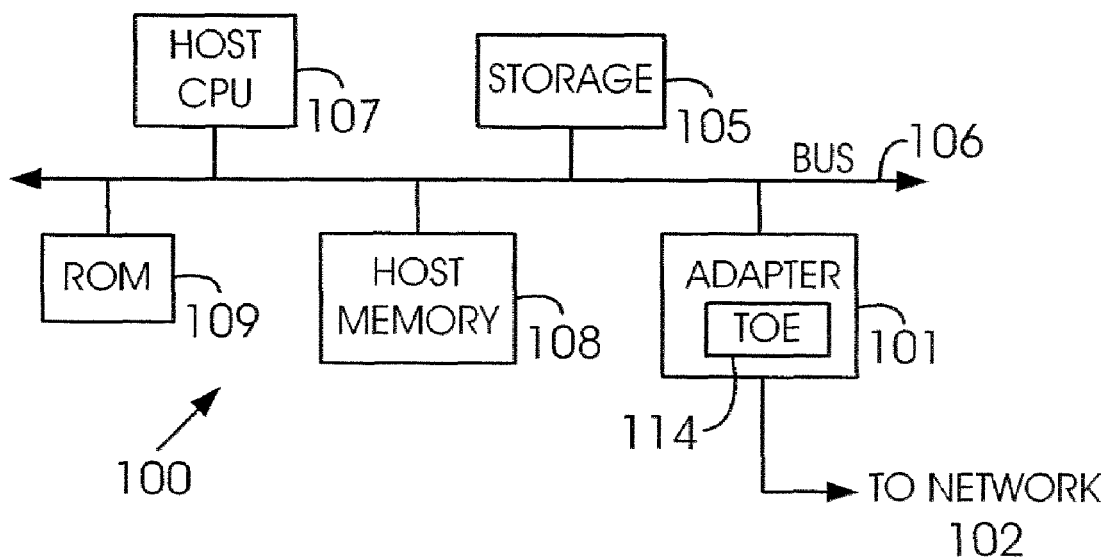
FIG. 1B shows computer system architecture according to one aspect of the invention.

FIG. 1B shows an example of an architecture used by host computing system (or host) 100. Host system 100 includes a central processing unit (CPU) 107 for executing computer-executable process steps and interfaces with a computer bus 106.

A storage device 105 also interfaces to host system 100 through computer bus 106. Storage device 105 may be disks, tapes, drums, integrated circuits, or the like, operative to hold data by any means, including magnetically, electrically, optically, and the like. Storage device 105 stores operating system program files, application program files, computer-executable process steps and others. Some of these files are stored on storage device 105 using an installation program. For example, CPU 107 executes computer-executable process steps of an installation program so that CPU 107 can properly execute the application program.

Read only memory ("ROM") 109 is provided to store invariant instruction sequences such as start-up instruction sequences or basic input/output operating system (BIOS) sequences.

Host memory 108 is coupled to the CPU 107 via system bus 106 or a local memory bus (not shown). Host memory 108 is used to provide CPU 107 access to data and program information that is stored in host memory 108 at execution time. Typically, host memory 108 is composed of random access memory (RAM) circuits. A computing system with the CPU and main memory is often referred to as a host system.

System 100 also includes a network adapter 101 having a TCP/IP accelerator module "TOE" (or "chip" or "system" or "engine") 114. TOE engine 114 provides assistance to improve the speed of iSCSI read and write transactions as well as a full implementation of a TCP/IP protocol. TOE 114 also includes an embedded Ethernet MAC, to connect a PCI based host to a LAN (not shown).

In conventional systems, a host CPU (for example, 107) executes the network protocol stack in software to process network packets. Conventional TOE engines also provide only a partial solution, because they cannot handle exceptions (for example, TCP/IP exceptions).

In the configuration shown in FIG. 1B, CPU 107 does not have to execute a network protocol stack in software because TOE 114 can perform that entire function. TOE 114 can establish and maintain a network connection to process network traffic. Details of a TOE 114 are provided in co-pending patent application Ser. No. 10/620,040, filed on Jul. 15, 2003, incorporated herein by reference in its entirety.

It is noteworthy that the present invention is not limited to any particular protocol or standard. Although the figures and the foregoing examples are based on offloading TCP/IP protocol and illustrate iSCSI transactions, in one aspect of the present invention, adapter 101 may include an offload engine that can process any network protocol stack (for example, the SPX/IPX protocol) for any transaction.

Figure 1C:
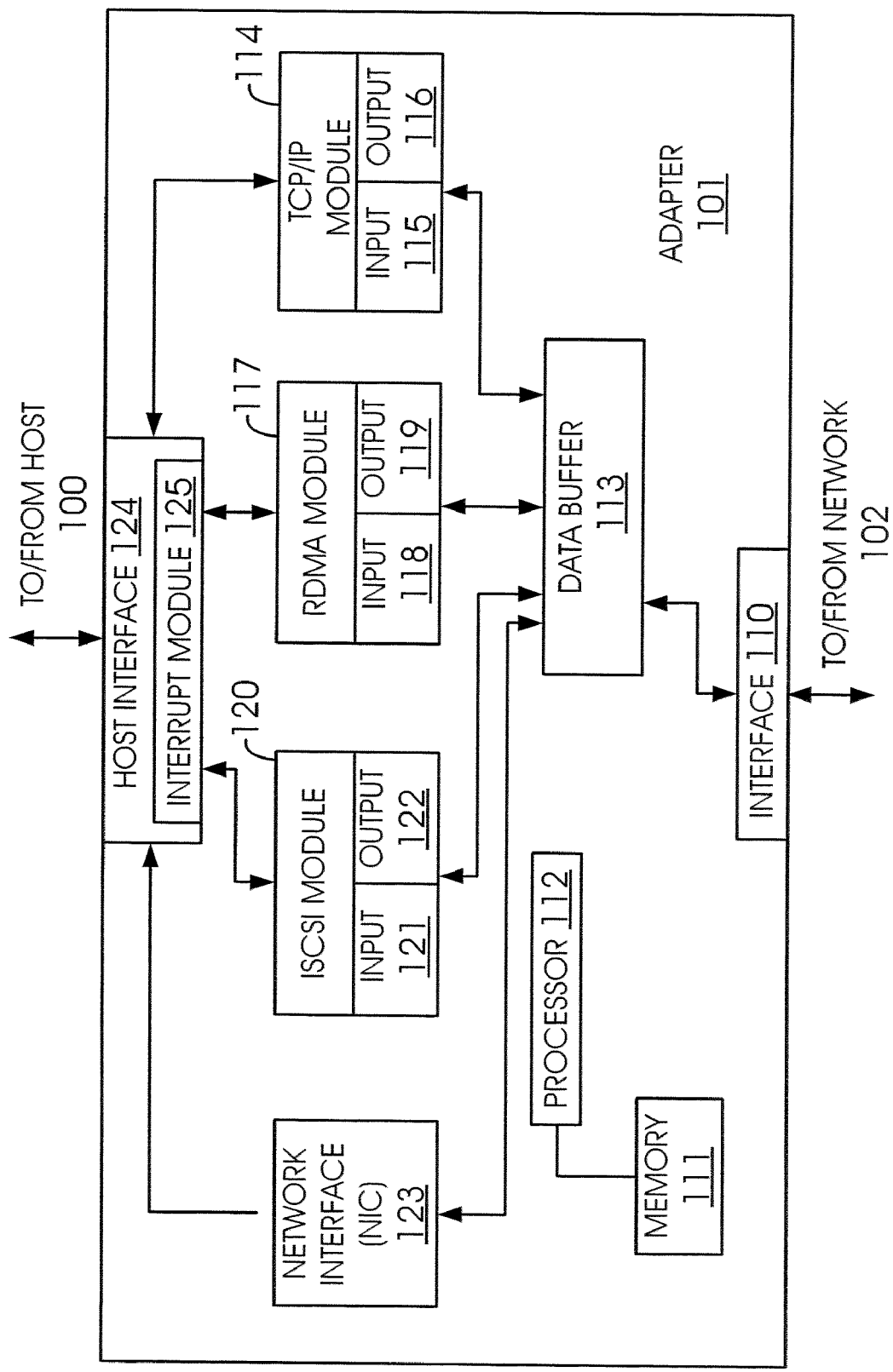
FIG. 1C shows a top-level block diagram of a host-bus adapter, according to one aspect of the present invention.

FIG. 1C shows a top-level block diagram of adapter 101, according to one aspect of the present invention. Adapter 101 may be used on a PCI development board with a Field Programmable gate Array ("FPGA"). The chip may also be integrated into an Application Specific Integrated Circuit ("ASIC") with an embedded serialize/de-serializer ('SERDES') (not shown) and internal programmable random access memory ("RAM").

Adapter 101 includes a network interface 110 that receives and sends packets to network devices via a network link. Adapter 101 also includes a processor 112, which executes adapter firmware (described below) out of memory 111, and a data buffer 113 for storing packets or information received from or transmitted to network 102.

Data buffer 113 is operationally coupled to multiple modules including a network interface card (NIC) module 123 for network protocol operations, an iSCSI module 120 for iSCSI protocol operations, a RDMA module 117 in RDMA protocol operations and TOE 114 for TCP/IP protocol operations.

iSCSI module 120, RDMA module 117, TCP/IP module (or TOE module) 114 include input modules 121, 118, 115, respectively, and output modules 122, 119, 116, respectively. Input modules 121, 118, 115, handle the network data coming into adapter 101 and pass the data onto host system 100. Output modules 122, 119, 116, send the data out to network 102.

Adapter 101 operates in two different modes: a TCP/IP mode where the TCP/IP software stack is executed in hardware in TOE 114; and a network interface mode where adapter 101 operates as a NIC for handling network protocols.

In computing, an interrupt is an asynchronous signal from hardware indicating the need for attention or a synchronous event in software indicating the need for a change in execution. Interrupts are generated from various sources (for example network interface 123, iSCSI module 120, RDMA module 117 and TCP/IP module 114) and components (for example input modules 121, 118, 115 and output modules 122, 119, 116) in adapter 101.

Adapter 101 communicates with host 100 via a host-interface 124 and holds the interrupts in adapter 101 in an interrupt module 125 for processing, Although interrupt module 125 is shown in host-interface 124, interrupt module 125 can be located anywhere in adapter 101. In one embodiment of the present invention, interrupt module 125 is a register.

Figure 2A:
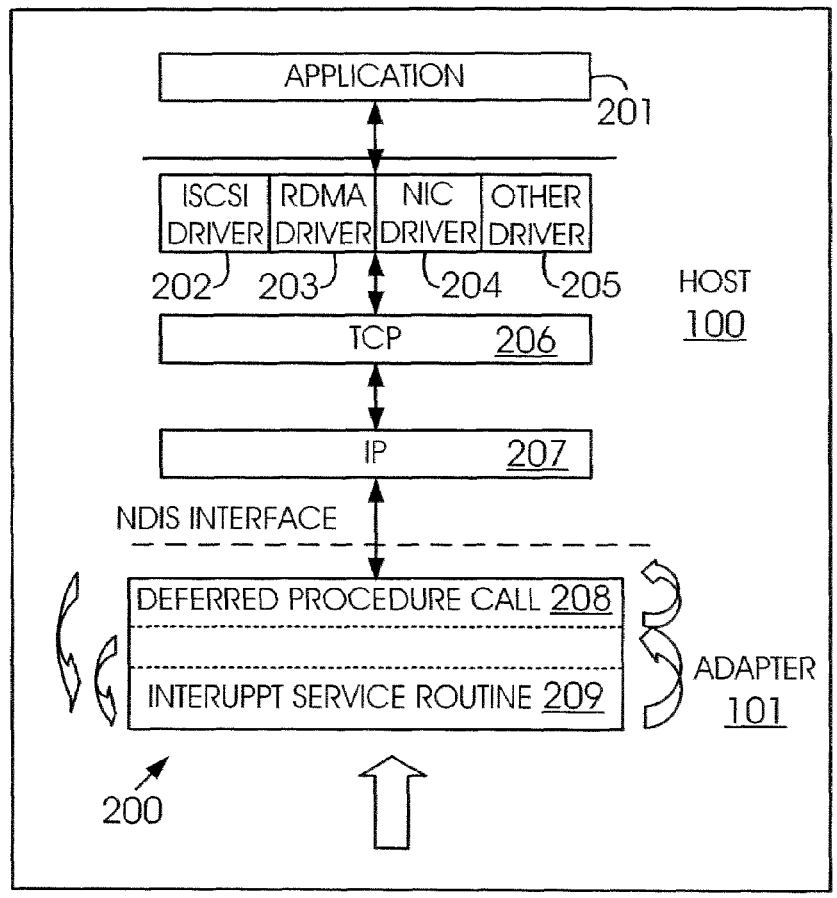
FIG. 2A shows a block diagram of a system used for managing interrupts originating from multiple modules, according to one aspect of the present invention.

FIG. 2A shows a block diagram of a system 200 used for managing interrupts originating from multiple modules, according to one aspect of the present invention. System 200 may be used in Windows operating system, Linux operating system, or any other environment. System 200 includes a host application 201 for communicating with network devices, host system 100 and adapter 101.

To communicate and interface with modules in adapter 101, host system 100 includes an iSCSI driver 202, a RDMA driver 203, a NIC driver 204, and other driver 205. Other driver 205 may be used by host system 100 to communicate and interface with any other module located in adapter 101.

Host system 100 also includes TCP stack 206 and IP stack 207, which are the standard top layer stacks that allow a network packet or data to be processed by a software based TCP/IP stack.

To process the interrupts, adapter 101 executes adapter firmware, which includes interrupt service routine (ISR) software 209 and deferred procedure call (DPC) software 208. ISR 209 is a callback subroutine in an operating system or device driver whose execution is triggered by the reception of an interrupt. ISRs (209) have a multitude of functions, which vary based on the reason the interrupt was generated and the speed at which the ISR completes its task. DPC 208 queues up task. DPC 208 queues up routine calls for execution of interrupts at a later point in time.

Adapters can have a single source or multiple sources that generate interrupts. In an adapter having a single source, there is only 1 interrupt associated with the source. So, when an interrupt event occurs from the source, ISR 209 notifies drivers 202, 203, 204, 205 in host system 101 which acknowledge the interrupt, causing the interrupt level to be de-asserted and spawn a deferred procedure call (DPC 208) to process the interrupt and clear the interrupt upon exiting the DPC.

In an adapter having multiple sources (modules and components in the present invention), interrupts can emanate from each of the sources. As a result, one source can monopolize ISR 209. To prevent this, the system and method of the present invention creates multiple groups, where a group can have any number of modules and when one particular module from a group sends an interrupt request to host system 101, host system 101 suspends that entire group's processing until that particular request is processed.

Figure 2B:
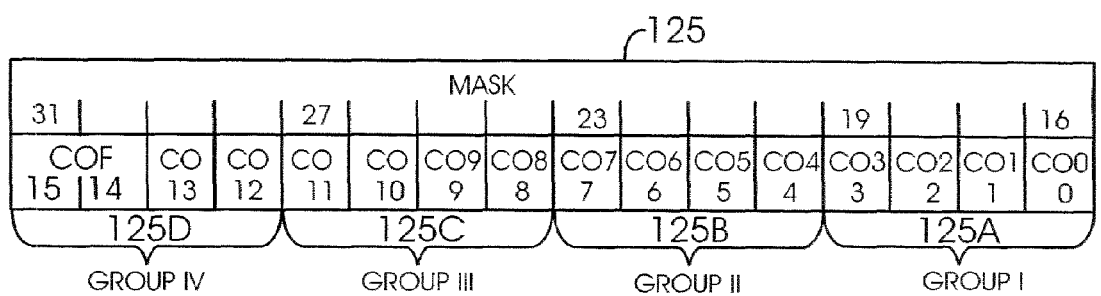
FIG. 2B shows an example of a register for storing interrupts, according to one aspect of the present invention.

FIG. 2B shows an example of interrupt module 125 for storing interrupts, according to one aspect of the present invention. Interrupt module 125 is divided into groups: Group I 125A; Group II 125B; Group III 125C; and Group IV 125D. Although four groups are shown, register 125 can be divided into more or less groups.

Each group can have any number of sources that can generate an interrupt. As described above, sources include, but are not limited to, modules and the components of the modules.

Figure 3:
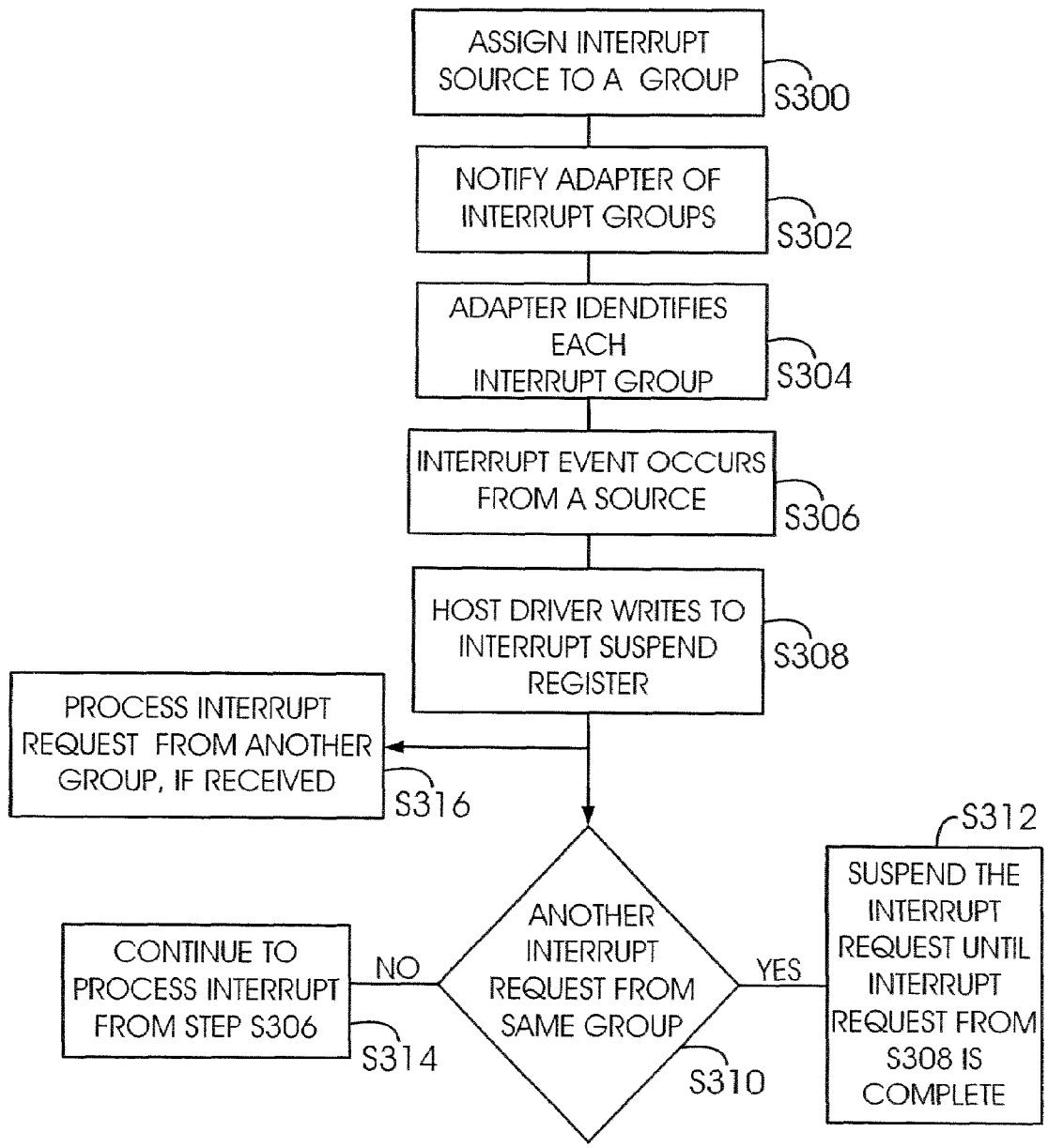
FIG. 3 shows a flow diagram for managing interrupts originating from multiple modules, according to one aspect of the present invention.

FIG. 3 shows a flow diagram for managing interrupts originating from multiple modules, according to one aspect of the present invention. In step S300, host driver for adapter 101 assigns interrupt sources (i.e. modules and/or components of the modules) to a group.

In step S302, the host driver notifies adapter 101 of the interrupt groups. In step S304, adapter 101 identifies the location in interrupt module 125 where interrupts from each interrupt group are stored.

In steps S306, an interrupt event occurs from a source. In step S308, host driver writes to interrupt module 125 (see FIG. 2B) upon the occurrence of an interrupt and that interrupt starts to get processed. In step S310, system monitors for additional interrupts interrupts from the same group. If there is another interrupt from the same group, in step S312, processing of this additional interrupt is suspended until the previous interrupt has completed processing. If an additional interrupt from the same group does not occur, in step S314, system continues to process the interrupts from step S306.

If an interrupt from an additional group is received while the interrupt from the first group is being processed, the interrupt from the additional group is processed in step S316.

In summary, the system and method of the present invention efficiently manages interrupts originating from multiple modules. For example, module 1 from group 1 generates the first interrupt, which is processed. If module 2 from group 1 sends another (or "additional" or "second") interrupt while module 1 interrupt is being processed, the second interrupt is suspended. If an interrupt from group 2 is received at the same time, the interrupt from group 2 is processed while the interrupt from group 1 is being processed.

In one aspect, plural interrupt requests may be serviced efficiently in a network adapter. This improves overall efficiency.

Although the present invention has been described with reference to specific embodiments, these embodiments are illustrative only and not limiting. Many other applications and embodiments of the present invention will be apparent in light of this disclosure and the following claims.

What is claimed is:

1. A method for managing interrupts, comprising:
    (a) assigning a first plurality of interrupt sources of an adapter to a first interrupt group;
    (b) assigning a second plurality of interrupt sources of the adapter to at least a second interrupt group;
    (c) notifying the adapter of the first interrupt group and the second interrupt group;
    (d) writing a first interrupt to an interrupt module, wherein the first interrupt is received from a first interrupt source of the first plurality of interrupt sources of the first interrupt group;
    (e) receiving a second interrupt;
    (f) suspending the second interrupt until the first interrupt is processed, if the second interrupt is requested from a second interrupt source within the first interrupt group; and
    (g) processing the second interrupt, while the first interrupt is being processed, if the second interrupt is received from an interrupt source of the second interrupt group.

2. The method of claim 1, wherein the interrupt module is a register.

3. The method of claim 1, wherein the first and second plurality of interrupt sources include a network interface card module, an iSCSI module, a RDMA module and a TCP/IP module.

4. The method of claim 3, wherein the multiple the plurality of interrupt sources include input modules and output modules of the network interface module.

5. The method of claim 1, wherein a host driver writes the first interrupt and the second interrupt to the interrupt module.

6. A system for managing interrupts, comprising:
   a host system that establishes a network connection via a network adapter;
   wherein the adapter includes a plurality of interrupt sources for generating interrupts and an interrupt module for holding the interrupts generated from the plurality of interrupt sources;
   wherein some of the plurality of interrupt sources are assigned to a first interrupt group and some of the other plurality of interrupt sources are assigned to at least a second interrupt group;
   wherein a first interrupt received from an interrupt source of the first interrupt group is processed and if a second interrupt from another interrupt source of the first interrupt group is received while the first interrupt is being processed, then the second interrupt is suspended until the first interrupt processing is complete; and
   wherein the second interrupt is processed while the first interrupt is being processed, if the second interrupt is received from an interrupt source from the second interrupt group.

7. The system of claim 6, wherein the interrupt module is a register.

8. The system of claim 6, wherein the multiple plurality of interrupt sources include a network interface card module, an iSCSI module, a RDMA module and a TCP/IP module.

9. The system of claim 8, wherein the plurality of interrupt sources include input modules and output modules of the network interface module.

10. A network adapter coupled to a host system comprising:
    a plurality of interrupt sources for generating interrupts; and
    an interrupt module for holding the interrupts generated from the plurality of interrupt sources;
    wherein some of the plurality of interrupt sources are assigned to a first interrupt group and some of the other plurality of interrupt sources are assigned to at least a second interrupt group;
    wherein a first interrupt received from an interrupt source of the first interrupt group is processed and if a second interrupt from another interrupt source of the first interrupt group is received while the first interrupt is being processed, then the second interrupt is suspended until the first interrupt processing is complete; and
    wherein the second interrupt is processed while the first interrupt is being processed, if the second interrupt is received from an interrupt source from the second interrupt group.

11. The adapter of claim 10, wherein the interrupt module is a register.

12. The adapter of claim 10, wherein the plurality of interrupt sources include a network interface card module, an iSCSI module, a RDMA module and a TCP/IP module.

13. The adapter of claim 12, wherein the plurality of interrupt sources include input modules and output modules of the network interface module.

14. The method of claim 5, wherein the host driver is executed by a host computing system operationally coupled to the adapter.

15. The system of claim 6, wherein a host driver executed by the host system writes the first interrupt and the second interrupt to the interrupt module.

16. The adapter of claim 10, wherein a host driver executed by the host system writes the first interrupt and the second interrupt to the interrupt module.

* * * * *

UNITED STATES PATENT AND TRADEMARK OFFICE
CERTIFICATE OF CORRECTION

| | | |
|---|---|---|
| PATENT NO. | : 7,549,005 B1 | Page 1 of 1 |
| APPLICATION NO. | : 11/615329 | |
| DATED | : June 16, 2009 | |
| INVENTOR(S) | : Shashank J. Pandhare et al. | |

It is certified that error appears in the above-identified patent and that said Letters Patent is hereby corrected as shown below:

In column 3, line 27, delete "("PPDU")"" and insert -- ("PDU")" --, therefor.

In column 4, line 49-50, delete "('SERDES')" and insert -- ("SERDES") --, therefor.

In column 5, line 19, delete "processing," and insert -- processing. --, therefor.

In column 7, line 7, in claim 4, after "wherein the" delete "multiple the".

In column 7, line 35, in claim 8, after "wherein the" delete "multiple".

Signed and Sealed this

Twelfth Day of October, 2010

David J. Kappos
*Director of the United States Patent and Trademark Office*